United States Patent
Kerem et al.

(10) Patent No.: US 6,701,222 B1
(45) Date of Patent: Mar. 2, 2004

(54) TRANSMISSION SYSTEMS AND COMPONENTS UTILIZING THERMO-STABILIZATION AND METHOD OF USE THEREIN

(75) Inventors: Samuel Kerem, Rockville, MD (US); Mark Howard Sherman, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 100 days.

(21) Appl. No.: 09/900,327

(22) Filed: Jul. 6, 2001

Related U.S. Application Data
(60) Provisional application No. 60/238,250, filed on Oct. 5, 2000, and provisional application No. 60/216,115, filed on Jul. 6, 2000.

(51) Int. Cl.⁷ .............................................. G05D 23/00
(52) U.S. Cl. ........................... 700/300; 700/299; 62/3.6
(58) Field of Search ................................. 700/299, 300; 62/3.2, 3.6, 208; 372/34; 385/37

(56) References Cited

U.S. PATENT DOCUMENTS

| | | | |
|---|---|---|---|
| 3,703,639 A | 11/1972 | Paxhia et al. | |
| 3,983,928 A | 10/1976 | Barnes | |
| 4,199,953 A | 4/1980 | Richter et al. | |
| 4,245,479 A | 1/1981 | Richter, Jr. et al. | |
| 4,739,409 A | 4/1988 | Baumeister | |
| 4,809,291 A | 2/1989 | Byer et al. | |
| 5,181,214 A | 1/1993 | Berger et al. | |
| 5,438,579 A * | 8/1995 | Eda et al. | 372/34 |
| 5,634,343 A | 6/1997 | Baker, III | |
| 5,655,375 A | 8/1997 | Ju | |
| 5,740,191 A * | 4/1998 | Kasper et al. | 372/34 |
| 5,901,572 A | 5/1999 | Peiffer et al. | |
| 5,966,394 A | 10/1999 | Spurr et al. | |
| 6,118,914 A | 9/2000 | Davis et al. | |
| 6,205,790 B1 * | 3/2001 | Denkin et al. | 62/3.7 |
| 6,522,459 B1 * | 2/2003 | Pease et al. | 359/341.4 |

* cited by examiner

*Primary Examiner*—Leo Picard
*Assistant Examiner*—Alexander Kosowski

(57) ABSTRACT

Transmission systems, components, and assemblies including a thermo-electric device which may include a variable duty cycle power supply and/or a variable hysteresis comparator in the form of a discrete component or embodied in digital or integrated form, such as in a processor. The systems, components, and assemblies may also include sensors that measure both chamber temperature and ambient temperature for thermo-stabilizing a device.

21 Claims, 9 Drawing Sheets

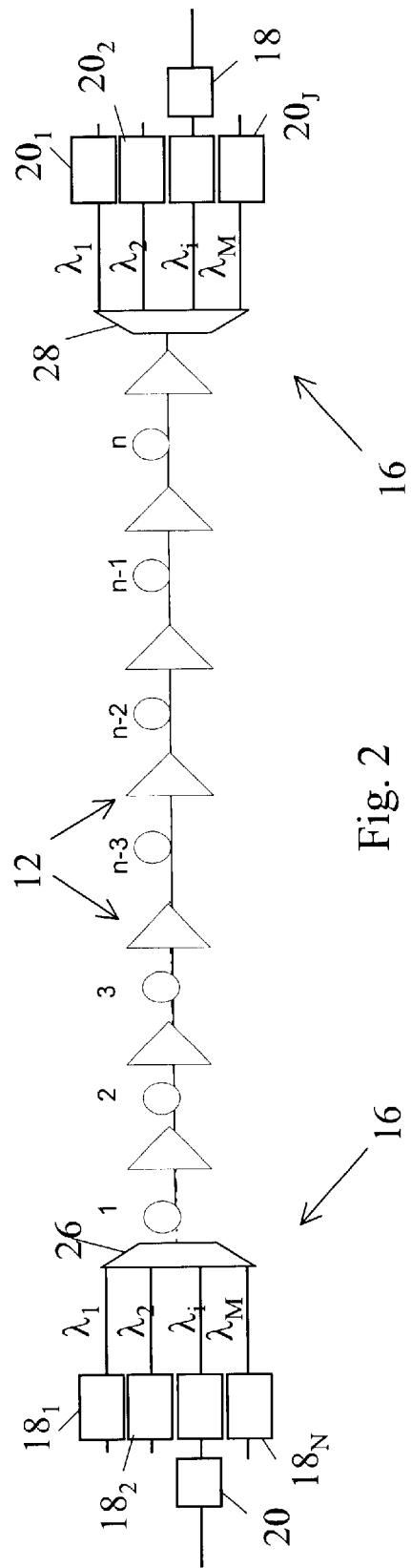
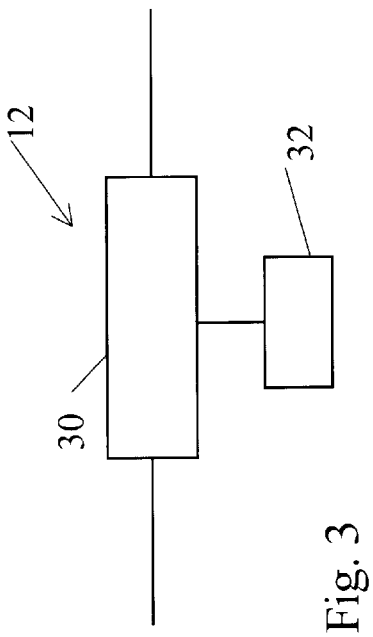
Fig. 2
Fig. 3

TRANSMISSION SYSTEMS AND COMPONENTS UTILIZING THERMO-STABILIZATION AND METHOD OF USE THEREIN

CROSS-REFERENCE TO RELATED APPLICATIONS

This application claims priority from U.S. Provisional Patent Application No. 60/216,115, filed Jul. 6, 2000, and 60/238,250, filed Oct. 5, 2000, both of which are incorporated herein by reference.

STATEMENT REGARDING FEDERALLY SPONSORED RESEARCH OR DEVELOPMENT

Not Applicable

1. Field of the Invention

The present invention is directed generally to transmission systems and components. More particularly, the invention is directed toward thermo-stabilization and transmission systems and components utilizing thermo-stabilization, and methods of thermo-stabilization.

2. Background of the Invention

The continued growth in traditional communications systems and the emergence of the Internet as a means for accessing data has accelerated demand for high capacity communications networks. Telecommunications service providers, in particular, have looked to wavelength division multiplexing (WDM) to increase the capacity of their existing systems to meet the increasing demand.

In WDM transmission system, pluralities of distinct information signals are carried using electromagnetic waves having different wavelengths in the optical spectrum, typically using infrared wavelengths. Each information carrying wavelength can include multiple data streams that are time division multiplexed ("TDM") together into a TDM data stream or a single data stream.

The pluralities of information carrying wavelengths are combined into a multiple wavelength, "WDM", optical signal that is transmitted in a single waveguide. In this manner, WDM systems can increase the transmission capacity of existing space division multiplexed ("SDM"), i.e., single channel, systems by a factor equal to the number of wavelengths used in the WDM system.

Communications systems, particularly WDM systems, include many temperature sensitive components and assemblies which must be thermo-stabilized for proper operation. For example, lasers, which are typically used in transmitters and amplifiers, as well as in other components, often must be maintained within a temperature range for proper operation. Furthermore, Bragg gratings, which can be used in most components in an optical system, particularly transmitters, receivers, add/drop devices, combiners, and distributors, require thermal stabilization for proper operation. Some components are always thermo-stabilized at a single temperature or temperature range. Other components are thermo-stabilized at any of two or more temperatures or temperature ranges, depending on the particular function to be performed.

Temperature sensitive components and assemblies are often thermo-stabilized using thermo-electric devices along with associated control circuits. One type of prior art thermo-electric assembly is illustrated in FIG. 9. That circuit uses linear regulation, in the form of variable resistance which is controlled by a controller, to control the current to the thermo-electric device. That design is inefficient, often resulting in efficiencies around 60% at high loads and less than 10% at light loads. Furthermore, that design does not provide a mechanism to switch the direction of current through the thermo-electric device, thereby limiting the thermo-electric device to either cooling only or heating only, but never cooling under some conditions and heating under others.

Another prior art control circuit is illustrated in FIG. 10. It uses four switches in an H-bridge configuration and is controlled by a controller. The switches are driven by variable duty cycle pulses at high frequency (typically in a range between about 50 kHz and about 500 kHz) to control the current through the thermo-electric device. That circuit is more efficient than the linear circuit, particularly at light loads, but it still has high losses due to switch capacitance. Furthermore, that design includes two L-C elements to filter and smooth the signal around the thermo-electric device. Those elements are bulky, result in additional power loss, and result in a relatively slow response time.

Yet another disadvantage of the prior art is that temperature of the device is typically determined indirectly by measuring the temperature of or within a chamber in which the device is located. That measurement, however, is not necessarily an accurate measurement of the temperature of the device. In particular, the fiber connected to the device conducts heat to and from the device, thereby affecting the temperature of the device (heat may also be transferred to and from the device by other paths). As a result, prior art thermo-stabilization systems which attempt to maintain a constant temperature within the chamber do not maintain a constant temperature of the device if the ambient temperature varies from the desired temperature of the device. In particular, the temperature of a device varies significantly with ambient temperature when using a prior art system of maintaining a constant chamber temperature. Such variations degrade the performance of the system and, in the case of a wavelength division multiplexed system, require more bandwidth for each channel in order to accommodate the variations caused by ambient temperature fluctuations. As a result, the total number of channels and the overall performance of the system may be decreased.

The development of higher performance communication systems depends upon the continued development of higher performance components and subsystems for use in the system. It is, therefore, essential that optical systems be developed having increased performance capabilities to meet the requirements of next generation optical systems. Accurate, fast, and efficient thermo-stabilization is essential for high performance systems and components.

BRIEF SUMMARY OF THE INVENTION

The apparatuses and methods of the present invention address the above need for improved thermo-stabilization.

One embodiment of the present invention includes a thermo-electric assembly, including a thermo-electric device, and a comparator responsive to a difference between a temperature of a device to be thermo-stabilized, or a chamber containing the device, and a set point temperature for the device or chamber to be thermo-stabilized, having a variable hysteresis, and having an output terminal controlling the current direction through the thermo-electric device. The thermo-electric device may also include a power converter providing variable current to the thermo-electric device, which is controlled by the comparator. The thermo-electric device may further include a processor controlling the variable hysteresis of the comparator.

In another embodiment of the present invention, the comparator is eliminated and the processor includes computer readable code which, when executed by the processor, causes the processor to be responsive to a difference between a temperature of a device to be thermo-stabilized and a set point temperature for the device to be thermo-stabilized, to have a variable hysteresis, and to control current through the thermo-electric device.

In another embodiment of the present invention the ambient temperature is used to dynamically vary the temperature of the chamber in which the device is located.

The present invention also includes optical systems including components and assemblies according to the present invention.

The present invention also includes a method of controlling temperature of a device. One embodiment of the method includes determining the temperature of the device, comparing the temperature of the device to a desired temperature for the device, and heating and cooling the device according to a difference between the temperature of the device and the desired temperature of the device and according to a variable hysteresis loop. The method may also include heating the device by passing current in a first direction through a thermo-electric device without changing direction of the current through the thermo-electric device. The method may also include cooling the device by passing current in a second direction, opposite the first direction, through the thermo-electric device without changing direction of the current through the thermo-electric device. The present invention also includes a method which compensates for temperature variations caused by the ambient temperature and dynamically adjusts the temperature of the chamber.

The optical systems, components, and methods of the present invention provide the increased speed, efficiency, stabilization, and accuracy necessary for transmission systems. These advantages and others will become apparent from the following detailed description.

BRIEF DESCRIPTION OF THE DRAWINGS

Embodiments of the present invention will now be described, by way of example only, with reference to the accompanying drawings for the purpose of illustrating present embodiments only and not for purposes of limiting the same, wherein:

FIGS. 1 and 2 show optical system embodiments;

FIGS. 3 and 4 show exemplary optical amplifier embodiments;

DETAILED DESCRIPTION OF THE INVENTION

Figure 1:
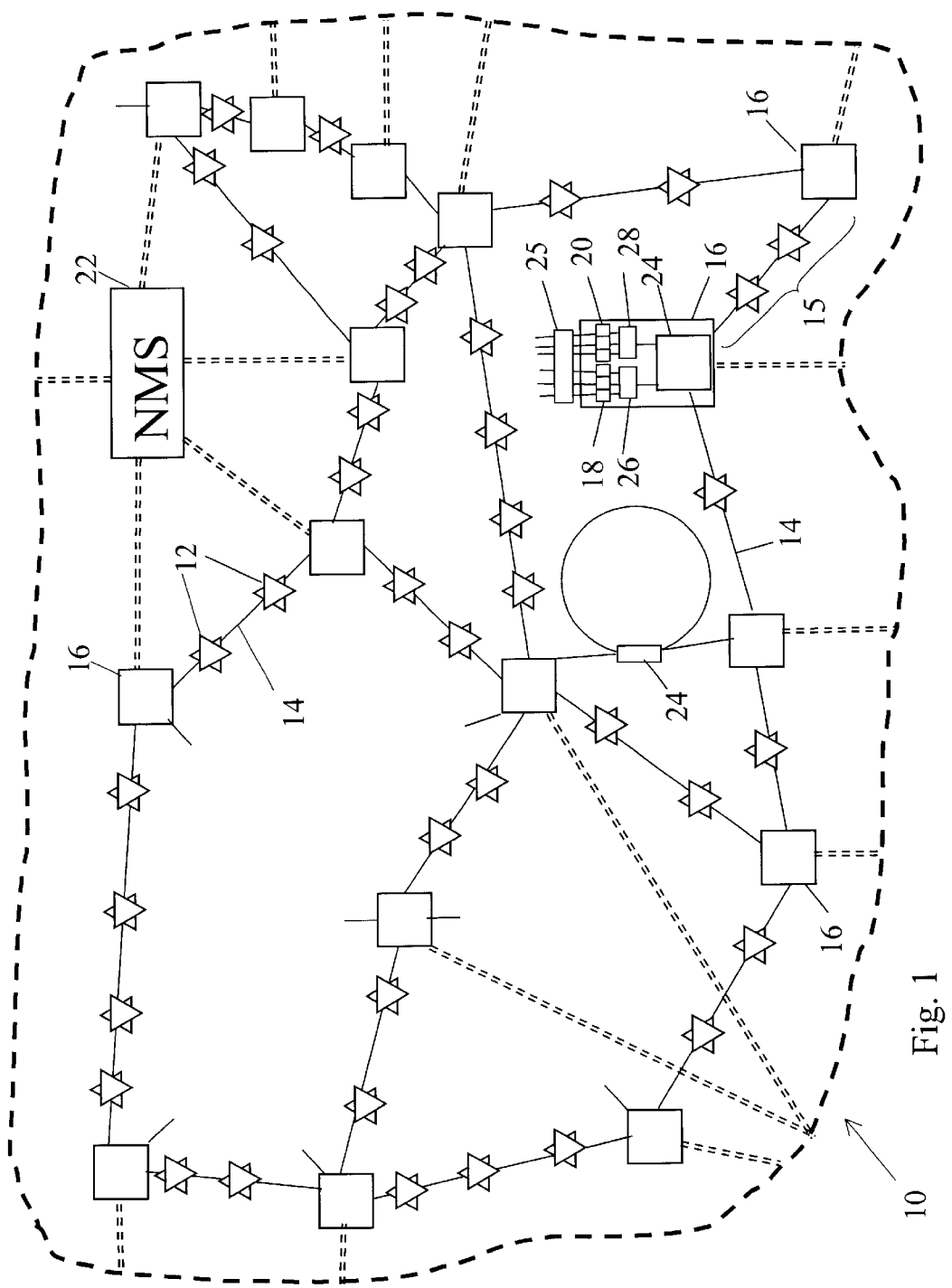

Optical systems 10 of the present invention include optical transmission medium 14 to carry optical signals passing through an optical link 15 between optical processing nodes 16. The nodes 16 can be configured to transmit information via the optical signals in one or more information carrying signal wavelengths, or signal channels, $\lambda_i$ to one or more other nodes 16. The optical system 10 can be configured in multi-dimensional networks (FIG. 1) or in one or more serially connected point to point links 15 (FIG. 2), which can be controlled by a network management system 22. Almost every part of the system 10, regardless of configuration, includes at least one component which needs to be thermally-stabilized.

The optical processing nodes 16 may include one or more optical processing devices, for example, transmitters 18, receivers 20, optical switching devices 24, such as optical add/drop multiplexers and switches/routers/cross-connects, interconnecting the transmitters 18 and receivers 20, as well as other optical systems. For example, broadcast and/or wavelength reusable, add/drop devices, and optical cross connect switches and routers can be configured via the network management system 22 in various topologies, i.e., rings, mesh, etc. to provide a desired network connectivity.

Optical amplifiers 12 can be disposed along the transmission media 14 to optically amplify optical signals in the transmission media 14. The optical amplifiers 12 and optical processing nodes 16 are referred to generally as network elements. The transmission media extending between successive network elements in the system 10 is referred to as a span. Whereas, the optical link 15 extends between successive nodes 16 and will include one or spans depending upon the configuration of the system 10. For example, FIG. 2 shows the link 15 including spans 1 through n.

The transmission media can include various guided and unguided media, and is typically optical fiber 14. Currently, the most commonly used optical fiber 14 in optical transmission systems is a single mode fiber, although multiple mode fibers can be used in various applications. The optical fibers 14 can have various dispersion and non-linear properties that affect the transmission properties of the system 10. One or more optical fibers 14 can be disposed to provide multiple optical links 15 between nodes 16 along a common optical path. In addition, each fiber can carry uni-or bi-directionally propagating optical signals depending upon the system 10 configuration.

The optical transmitters 18 and optical receivers 20 are configured respectively to transmit and receive information via optical signals including one or more information carrying optical signal wavelengths, or signal channels, $\lambda_i$. In the present description, the term "information" should be broadly construed to include any type of information that can be optically transmitted including voice, video, data, instructions, etc.

The transmitters 18 used in the system 10 generally will include a narrow bandwidth laser optical source, such as a DFB laser, that provides an optical carrier. The transmitters 18 also can include other coherent narrow or broad band sources, such as sliced spectrum or fiber laser sources, as well as suitable incoherent optical sources as appropriate. Information can be imparted to the optical carrier either by directly modulating the optical source or by externally modulating the optical carrier emitted by the source. Alternatively, the information can be imparted to an electrical carrier that can be upconverted onto an optical wavelength to produce the optical signal. The information can be amplitude, frequency, and/or phase modulated using various formats, such as return to zero ("RZ"), non-return to zero ("NRZ"), differential phase shift keying ("DPSK"), etc., encoding techniques, such as forward error correction ("FEC"), etc., and transmission protocols, such as SONET/SDH, IP, ATM, etc.

The optical receiver 20 can be configured to correspond to the particular modulation format used in the transmitters 18. The receiver 20 can receive the signals using various detection techniques, such as coherent detection, optical filtering and direct detection, and combinations thereof. Employing tunable transmitters 18 and receivers 20 in the optical nodes 16 in a network, such as in FIGS. 1–2, can provide additional versatility in performing traffic planning and wavelength assignment in the system 10.

The transmitters 18 and receivers 20 can be also connected to interfacial devices 25, such as electrical and optical cross-connect switches, IP routers, etc., to provide interface flexibility within, and at the periphery of, the optical system 10. The interfacial devices 25 can be configured to receive, convert, aggregate, and provide information in one or more various protocols, encoding schemes, and bit rates to the transmitters 18, and perform the converse function for the receivers 20. The interfacial devices 25 also can be used to provide protection and restoration switching in various nodes 16 depending upon the configuration. The interfacial devices 25 can be electrically connected to the transmitters 18 and receivers 20 or optically connected via short, intermediate, and/or long reach optical interfaces.

Signal wavelengths $\lambda_i$ can be combined using optical combiners 26 into WDM optical signals and transmitted through the fiber 14. The transmitters 18 can transmit the information using directly or externally modulated optical carrier sources or optical upconverters. Likewise, optical distributors 28 can be provided to distribute optical signals to the receivers 20, which can include both direct and coherent detection receivers. For example, N transmitters 18 can be used to transmit M different signal wavelengths to J different receivers 20. In various embodiments, one or more of the transmitters 18 and receivers 20 can be wavelength tunable to provide wavelength allocation flexibility in the optical system 10.

Optical combiners 26 can be provided to combine optical signals from different optical paths onto a common path, e.g. fiber. Likewise, optical distributors 28 can be provided to distribute optical signals from a common path to a plurality of different optical paths. The optical combiners 26 and distributors 28 can include wavelength selective and non-selective ("passive") fiber and free space devices, as well as polarization sensitive devices. Passive or WDM couplers/splitters, circulators, dichroic devices, prisms, gratings, etc. can be used alone, or in combination with various tunable or fixed, high, low, or band pass or stop, transmissive or reflective filters, such as Bragg gratings, Fabry-Perot, Mach-Zehnder, and dichroic filters, etc. in various configurations of the optical combiners 28 and distributors 28. Furthermore, the combiners 26 and distributors 28 can include one or more serial or parallel stages incorporating various devices to multiplex, demultiplex, and multicast signal wavelengths $\lambda_i$ in the optical systems 10.

As shown in FIG. 2, optical amplifiers 12 can be disposed along the transmission fiber 14 to overcome attenuation in the fiber 14 and proximate the optical processing nodes 16 to overcome loss associated with the nodes 16, as required. The optical system 10 can include one or more amplifier types. For example, various lumped and/or distributed doped and/or non-linear fiber amplifiers, such as Erbium and Raman amplifiers, that can be locally and/or remotely supplied with optical power can be used, as well as other amplifier types. The amplifiers 12 can be deployed in serial and/or parallel stages $12_i$ and in combinations of filters, attenuators, isolators and other signal varying devices, as well as add/drop and other optical processing devices, disposed between amplifier stages $12_i$ and before and/or after the amplifier 12. In addition, the amplifiers 12 can be locally and/or remotely controlled depending upon the configuration of the system 10.

As shown in FIG. 3, the optical amplifiers 12 generally include an optical amplifying medium 30 supplied with power from an amplifier power source 32. Optical signals passing the amplifying medium are optically amplified by the medium 30 using energy supplied from the power source 32.

Figure 4:
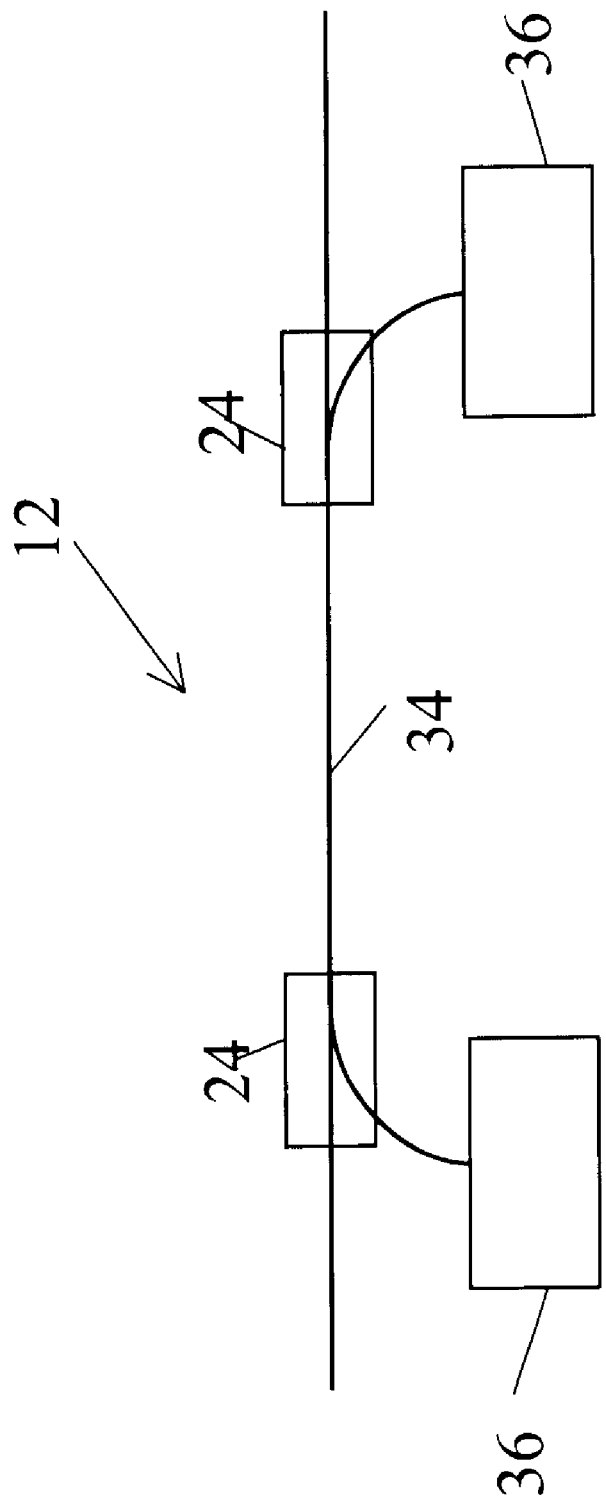

As shown in FIG. 4 and for the sake of clarity, the optical amplifier 12 will be described further in terms of an amplifying fiber 34 supplied with power in the form of optical, or "pump", energy from one or pump sources 36. However, it will be appreciated that optical amplifiers 12 including other amplifying media 30, i.e., semiconductor, etc., may be substituted with appropriate modification, as previously mentioned.

The amplifying fiber 34 will generally be a doped fiber and fiber suitable for producing non-linear interactions, such as stimulated Raman scattering, that can be used to amplify optical signals. The optical fiber 34 will be supplied with optical energy in one or more pump wavelengths $\lambda_{pi}$ that is used to amplify the signal wavelengths $\lambda_i$ passing through the amplifying fiber 34. One or more dopants can be used in the doped amplifying fiber 34, such as Er, other rare earth elements, e.g., Yb and Nd, as well as other dopants. The doped and Raman amplifying fibers 34 can be distributed as part of the transmission fiber 14, or concentrated/lumped at discrete amplifier sites, and can be locally or remotely pumped with optical energy.

The amplifying fiber 34 can have the same or different transmission and amplification characteristics than the transmission fiber 14. For example, dispersion compensating fiber, zero and non-zero dispersion shifted fibers, non-dispersion shifted, "standard", fiber and other fiber types can be intermixed as or with the transmission fiber 14 depending upon the system configuration. Thus, the amplifying fiber 34 can serve multiple purposes in the optical system, such as performing dispersion compensation and different levels of amplification of the signal wavelengths $\lambda_i$.

The pump source 36 can include one or more narrow band or broad band optical sources 38, each providing optical power in one or more pump wavelength ranges designated by center pump wavelengths $\lambda_{pi}$ and including one or more modes. The optical sources 38 can include both coherent and incoherent sources, which can be wavelength stabilized and controlled by providing, for example, a Bragg grating or other wavelength selective, reflective element in a pig tail fiber of the source. A portion of the pump power can be tapped to an O/E converter an optical source controller employed to provide feedback control over the optical source.

Various configurations of combiners 26, as previously described, can be used to combine pump wavelengths $\lambda_{pi}$ for introduction in the amplifying fiber 34. Pump energy can be supplied to the amplifying fiber 34, either counter-propagating and/or co-propagating with respect to the propagation of the signal wavelengths $\lambda_i$. It will be appreciated that in a bi-directional amplifier 12, the pump wavelengths $\lambda_{pi}$ will be counter-propagating relative to signal wavelengths $\lambda_i$ in one direction as well as co-propagating relative to signal wavelengths $\lambda_i$ in the other direction.

Figure 5:
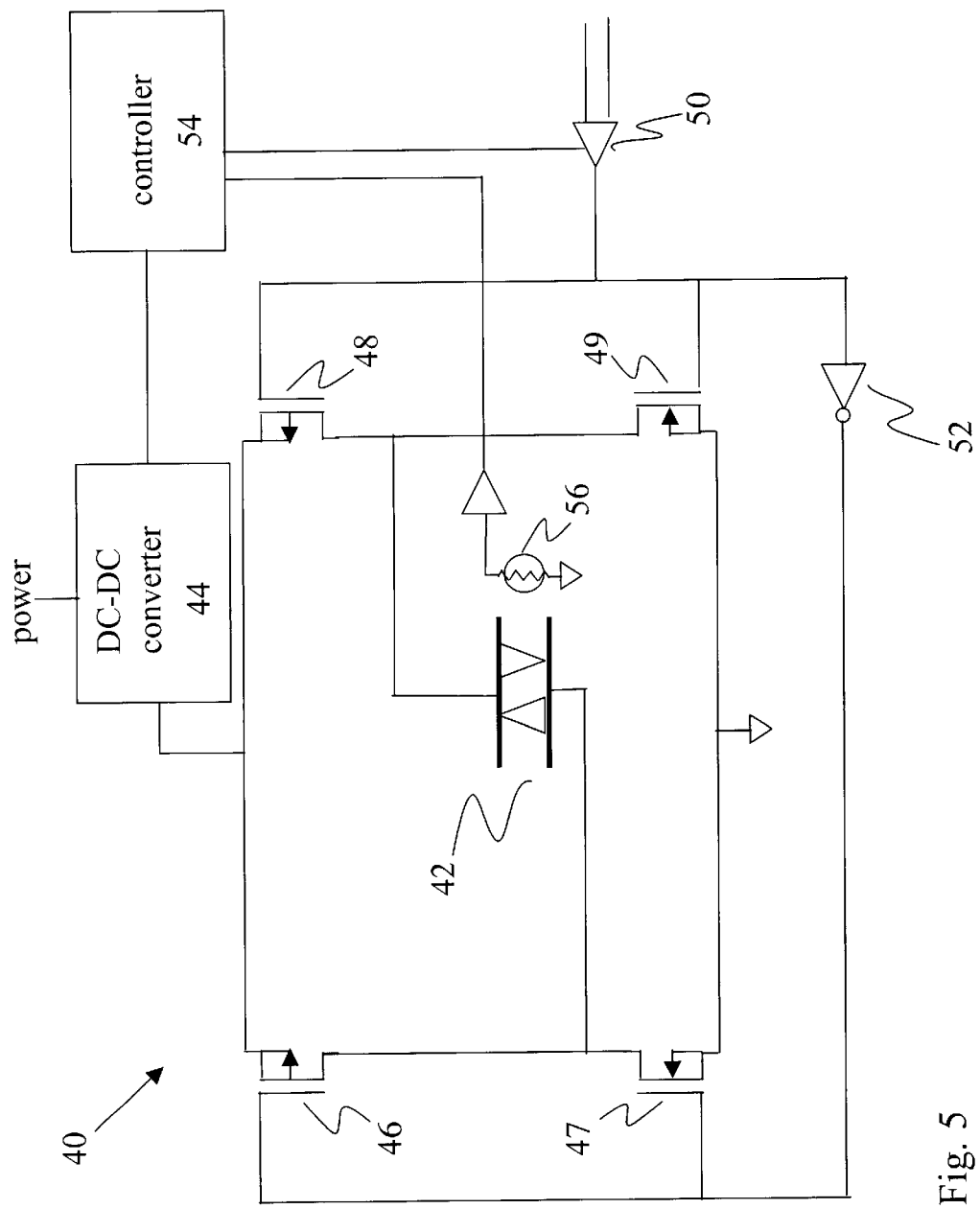
FIG. 5 shows a thermo-electric assembly according to one embodiment of the present invention.

FIG. 5 illustrates one embodiment of the present invention in the form of a thermo-electric assembly 40. In the illustrated embodiment, the assembly 40 includes a thermo-electric device 42, a DC-DC converter 44, switches 46, 47, 48, 49, a comparator 50, an inverter 52, and a controller 54.

The thermo-electric device ("TED") 42 typically has one plate (not shown) thermally coupled to a heat sink, which may be exposed to temperatures at or near ambient temperature, and another plate (not shown) thermally coupled to the device (not shown) which is to be thermo-stabilized. The thermo-electric device 42 transfers heat between the two plates in a direction and magnitude determined by the direction and magnitude of the current through the thermo-electric device 42. Accordingly, the thermo-electric device 42 can cool or heat the device to be thermo-stabilized.

The DC-DC converter 44 provides power to the thermo-electric device 42. Although the present invention will be described in terms of a DC-DC converter 44, the present invention can use any form of variable power supply. The DC-DC converter 44 may be, for example, a self-driven or control-driven synchronous rectifier, and can also include other converter 44 designs, including less efficient linear converters. The use of less efficient converter 40 designs, however, will typically result in a less efficient thermo-electric assembly 40. The current or power supplied by the converter 44 can be varied, for example, by varying the duty cycle of the output voltage of the converter 44. As a result, the magnitude of the current flowing through the TED 42 can be controlled without switching the switches 46–49, thereby reducing capacitive switching losses. Furthermore, because the converter 44 can vary the current through the TED, the assembly 40 does not require L-C elements around the TED 42, thereby reducing the cost and size of the device, while increasing the response time and efficiency. The converter 44 may utilize an L-C element output filter, while still realizing the above-mentioned improvements over the prior art.

The power or current supplied by the DC-DC converter can be controlled based on various factors, such as the difference between actual and desired temperature for the device or chamber to be thermo-stabilized. For example, if there is a large difference between the actual and desired temperature, a greater initial current can be provided by the DC-DC converter 44 to provide for a quicker convergence. When the temperature difference is small, or as the actual temperature begins to approach the desired temperature, the current can be reduced to control overshoot. The controller 54 can control the DC-DC converter 44 based on feedback, for example, from thermistors and current sensors.

The switches 46–49 control the flow of current through the thermo-electric device 42. The switches 46–49 can be, for example, field effect transistors, mechanical switches, or other devices for controlling current to the thermo-electric device 42. Less efficient switches also may be used, such as bipolar junction transistors. The use of less efficient switches 46–49, however, will typically result in a less efficient thermo-electric assembly 40.

The comparator 50 and the inverter 52 control the switches 46–49. The comparator 50 and inverter 52 may be formed from discrete components or may be integrated into another component or embodied in digital form. For example, the comparator 50 may be a discrete operational amplifier or it can be embodied as software or firmware in the controller 54. The comparator 50 can have a variable hysteresis and receive feed back indicative of the difference between the desired temperature of the device to be thermo-stabilized and feedback indicative of the actual temperature of the device to be thermo-stabilized. The comparator 50 can receive input signals, such as the desired temperature, for example, from the controller 54 and/or from the thermistor 56. The comparator 50 may further receive a signal from the controller 54 which adjusts the variable hysteresis of the comparator 50. The inverter 52 may be eliminated if, for example, the comparator 50 includes dual, inverted outputs, or if the switches 46–49 are selected such that a single signal can properly control all of the switches 46–49.

The hysteresis of the comparator 50 controls the gap between heating mode and cooling mode. In one embodiment, the magnitude of current through the TED 42 is monitored, such as with a current sensor connected to the controller 54, and that information is used to adjust the hysteresis. The magnitude of current through the TED 42 is indicative of the temperature difference between the plates or heat sinks of the TED 42. When the current (and therefore the temperature difference) is small, the heat dissipation is small so a small hysteresis will allow close tracking between the desired and actual temperature with only small power consumption by the TED. On the other hand, when the temperature difference is large, a larger hysteresis can be used to reduce undesirable cycling between heating and cooling modes and because temperature overshoot will be compensated for through the higher heat dissipation. The hysteresis can be symmetrical or asymmetrical about the desired temperature. For example, if the ambient temperature is much lower than the desired temperature, the hysteresis range can be from just slightly below the desired temperature to significantly above the desired temperature. The variability of the present invention allows for fast response times and low verge (<0.1 C) between heating and cooling modes.

The controller 54 provides control signals to one or more components in the assembly 40, typically in response to feedback indicative of various parameters, such as the temperature of the thermo-electric device 42 the temperature of the device which is to be thermo-stabilized, the ambient temperature, and other parameters. The controller 54 may, for example, receive signals indicative of the various temperature values from thermistors or other temperature sensing devices, which can be in thermal contact with the device to be thermo-stabilized or in thermal contact with something else, such as the chamber holding the device to be thermo-stabilized. A single thermistor 56 is shown in the illustrated embodiment, although additional thermistors may be utilized to provide feedback to the controller 54 and to other components, such as the comparator 50. Temperature sensing in the present invention will be discussed in terms of thermistors, although other temperature sensing devices can also be used.

The controller 54 may adjust the hysteresis of the comparator 50, as well as other parameters to control the thermo-electric device 42. The controller 54 may control the DC-DC converter 44, for example, by providing the synchronous control signals when the converter 44 is a control driven synchronous rectifier. The controller 54 may be, for example, a general purpose processor, an application specific integrated circuit, a circuit of discrete components, or combinations thereof.

The assembly 40 may be operated predominantly as a static H-bridge, thereby allowing for a reduction in capacitive switching losses when compared to the switching circuits taught in the prior art. The amount of switching required with the present invention is significantly reduced as compared to the prior art because, in part, the magnitude of current to be provided to the TED 42 may be varied by varying the output, such as by varying the duty cycle of the DC-DC converter 44, rather than by operating the switches 46–49 at a high speed with a variable duty cycle. The number of transitions between heating and cooling modes can be further reduced with the variable hysteresis of the comparator 50. Stabilization of the current through the TED 42 can be achieved by controlling the DC-DC converter 44, as described above, thereby realizing additional efficiencies by eliminating the need for bulky L-C element around the TED 42 (although an L-C element may be utilized in the DC-DC converter 44, as well as in other parts of the assembly, if desired).

Figure 6:
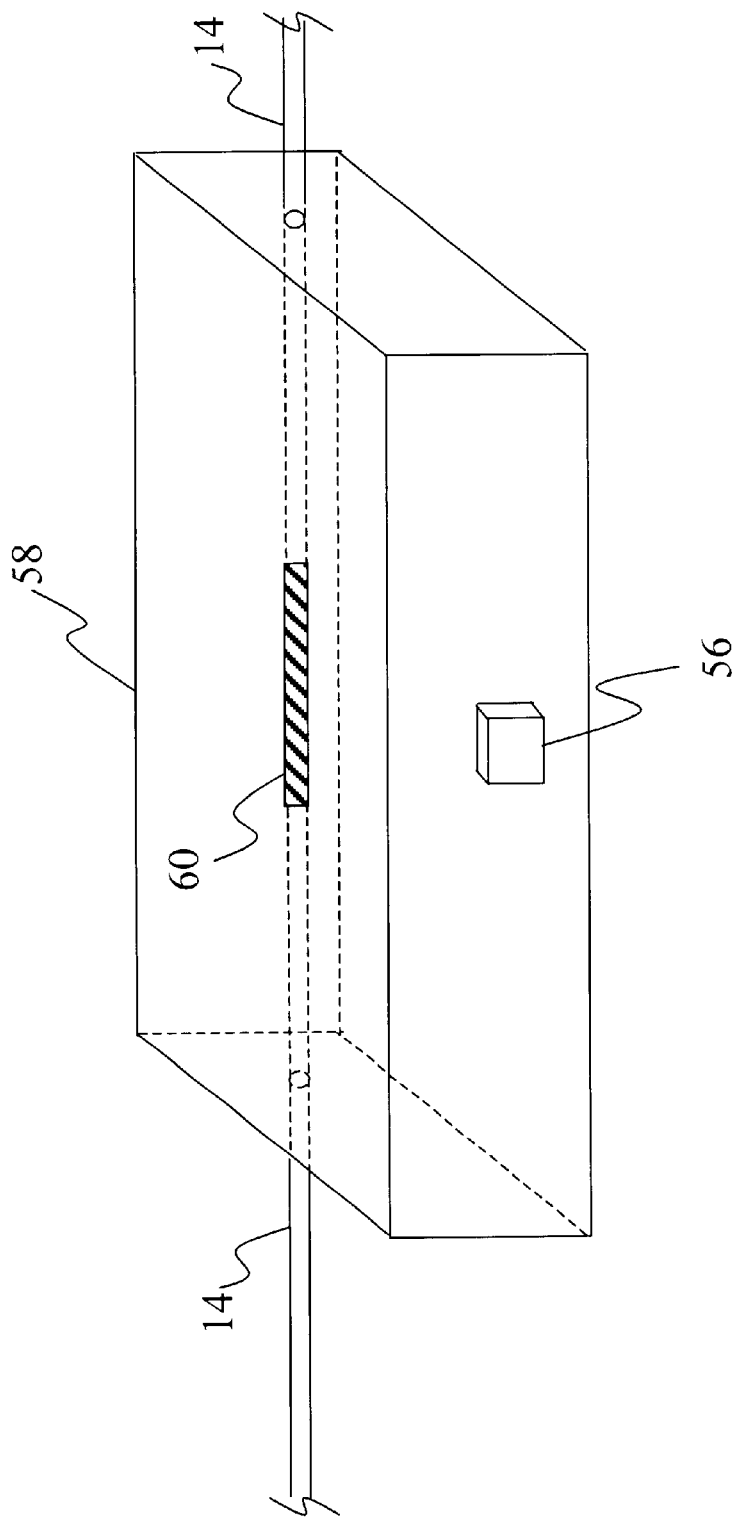
FIG. 6 shows an embodiment of the present invention illustrating the chamber and sensor.

FIG. 6 shows an embodiment of the present invention in which the device 60 to be thermo-stabilized is located in a chamber 58 and is temperature controlled by the thermo-electric device 42. A sensor 56 provides feedback and is thermally connected to the chamber 58. The optical transmission medium 14 is connected to the device 60 and enters and exits the chamber 58. In the illustrated embodiment the transmission medium 14 enters/exits the chamber 58 twice, as is typically the case for amplifiers and some filters, although in other embodiments the transmission medium 14 can enter/exit the chamber 58 more or less than twice.

Figure 7:
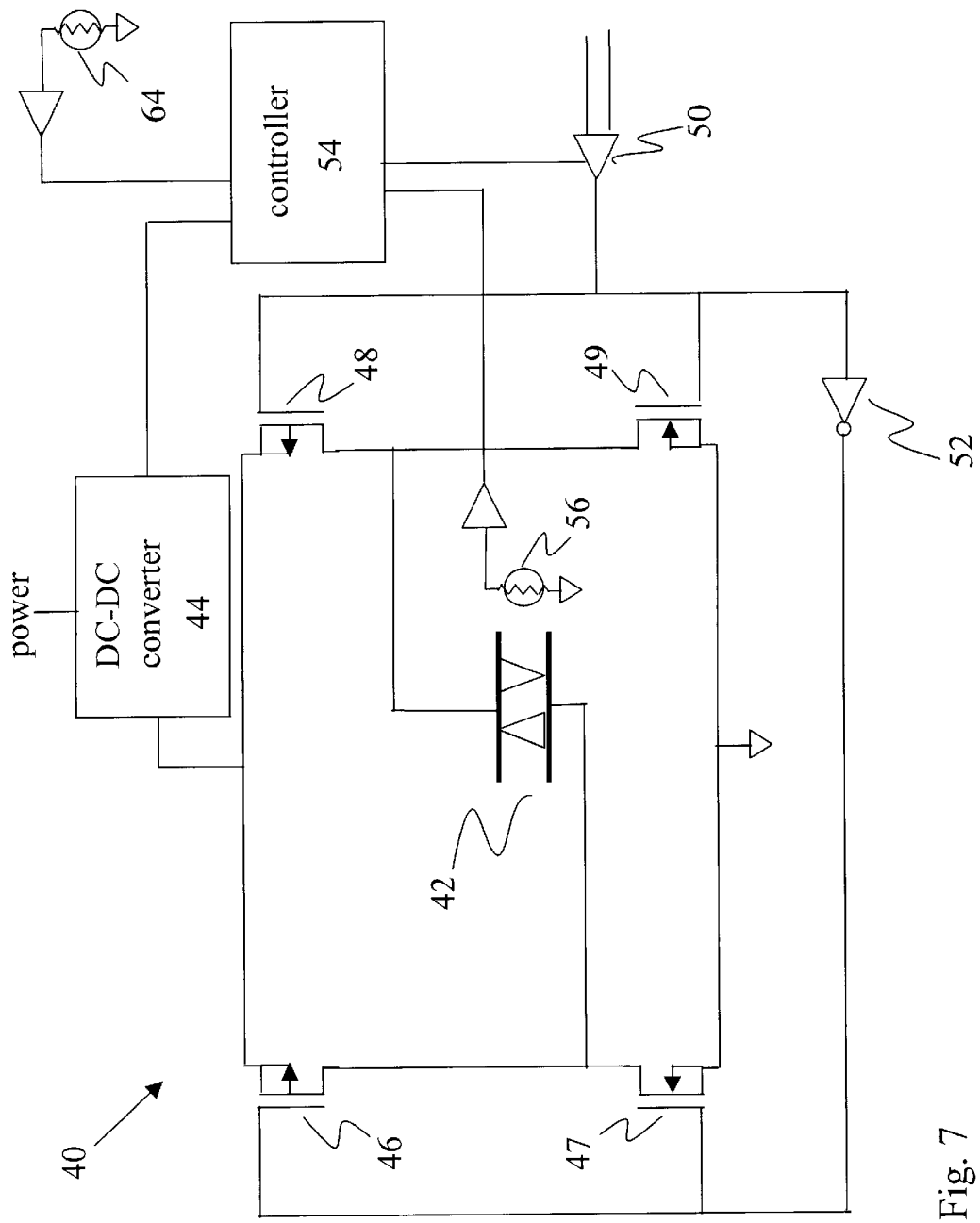
FIG. 7 shows a thermo-electric assembly according to another embodiment of the present invention.

FIG. 7 shows another embodiment of the present invention which includes a second thermistor 64 for producing a signal indicative of ambient temperature. The second thermistor 64 can, for example, be thermally attached to the ambient heat sink of the thermo-electric device 42. The illustrated embodiment provides for better thermo-stabilization because it compensates for heat transfer, such as that which occurs through the optical transmission medium 14, to and from the device being thermo-stabilized.

Figure 8:
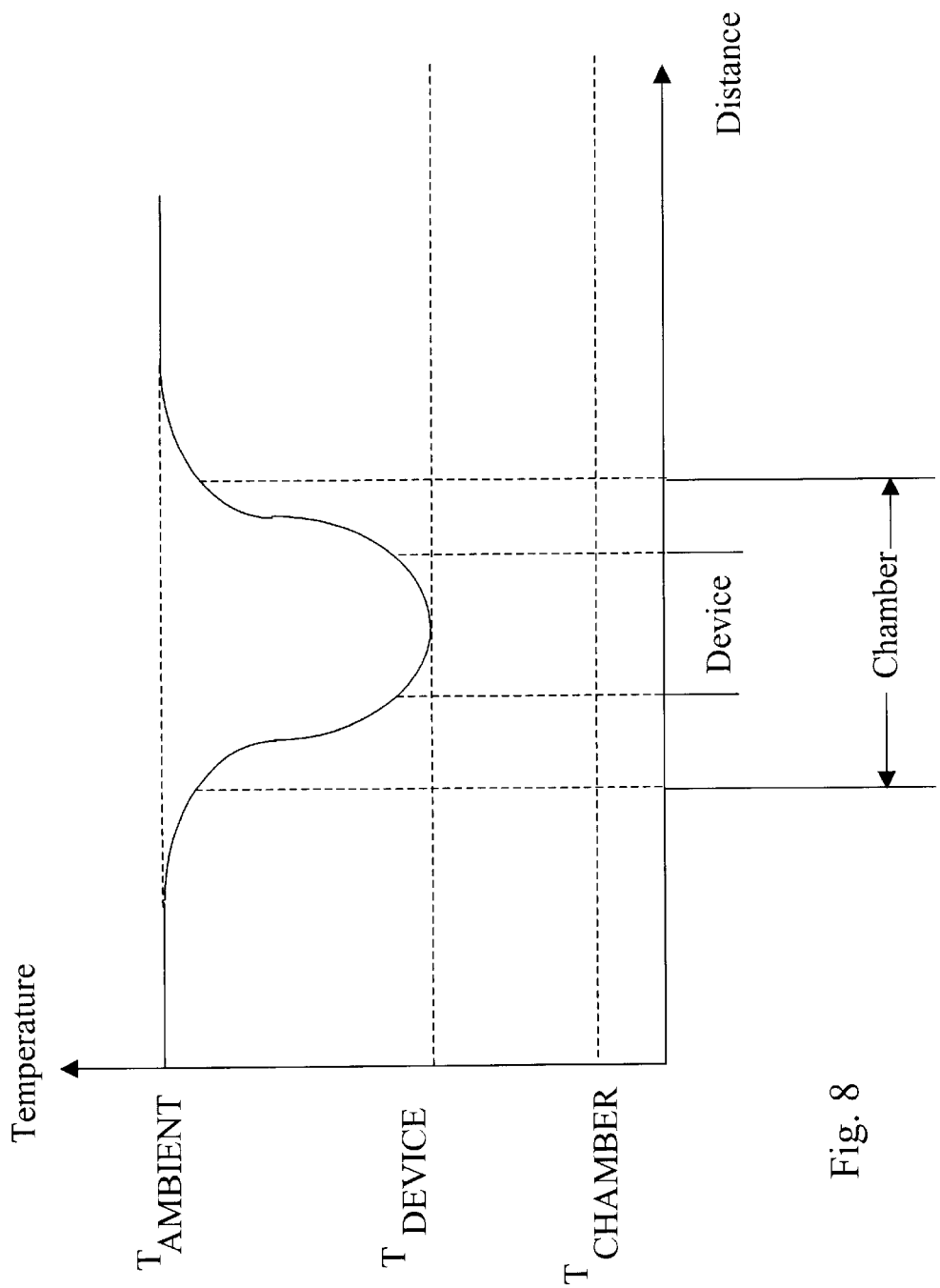
FIG. 8 shows temperature variation along an optical transmission medium and device to be thermo-stabilized.
Figure 9:
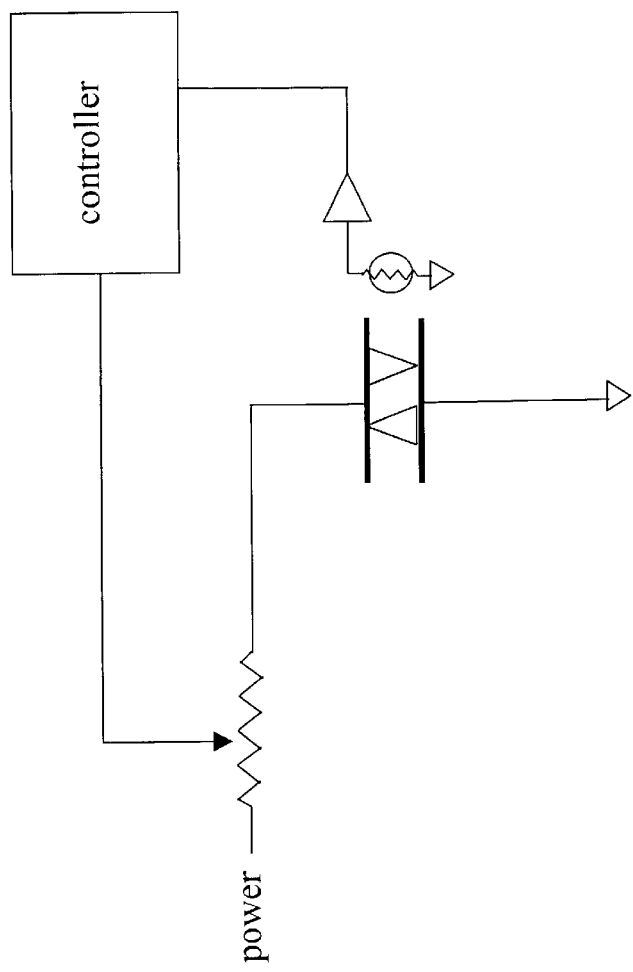
FIGS. 9 and 10 show prior art thermo-electric assemblies.
Figure 10:
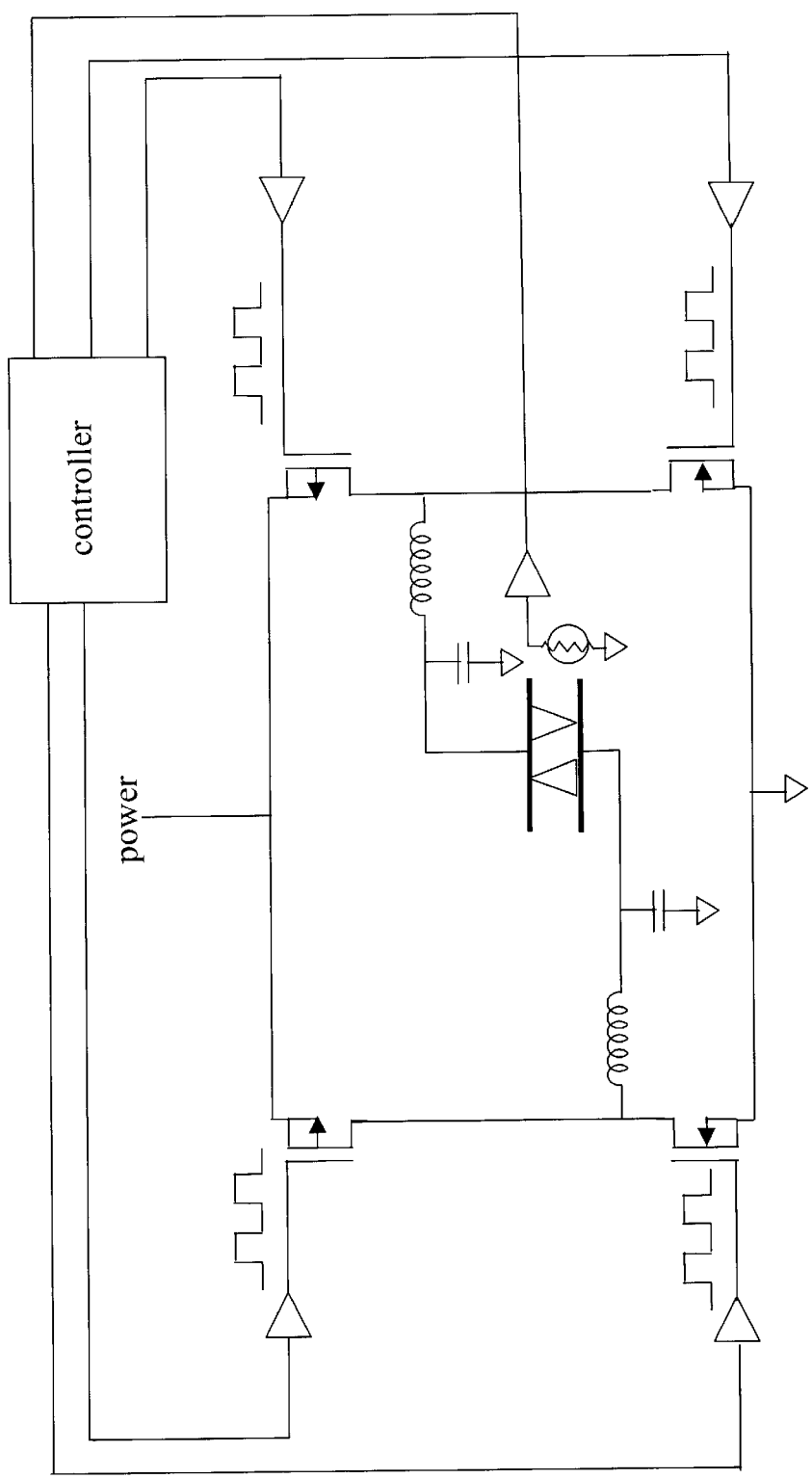

FIG. 8 is a graph illustrating an example of temperature variations along a portion of an optical transmission medium 14 around the device 60 to be thermo-stabilized, such as the embodiment illustrated in FIG. 6. In particular, the optical transmission medium 14 is exposed to ambient temperature, and ambient temperature variations, over most of its length. Furthermore, the device (for example, a fiber Bragg grating) makes up only a small part of the optical transmission medium 14. Typically, the temperature of the chamber 58 is monitored by the first thermistor 56 and is controlled by the thermo-electric device 42. However, the optical transmission medium 14 is at ambient temperature as it enters the chamber 58 and approaches the device, and heat transfer through the optical transmission medium 14 will cause the temperature of the device 60 to be somewhere between the temperature of the chamber 58 and the ambient temperature. It will be appreciated that ambient temperature can, for example, be the temperature in a room containing the equipment or the temperature within a temperature controlled rack containing the equipment, or some other temperature.

The temperature of the device 60 will be influenced by both the heat transfer through the optical transmission medium 14 and the heat transfer effected by the thermo-electric device 42. In the illustrated embodiment the ambient temperature is greater than the chamber 58 temperature. However, the converse situation is analogous to the illustrated example, and the present invention is applicable to both situations. The embodiment of FIG. 7 compensates for the temperature difference by monitoring the ambient temperature with the second thermistor 64, and making appropriate adjustments to maintain the device 60, and not just the chamber 58, at the desired temperature.

In one embodiment, the desired temperature of the chamber 58 is dynamically adjusted to compensate for heat transfer through the optical transmission medium 14 and to maintain the device 60 at the desired temperature. The controller 54 receives a signal indicative of ambient temperature from the second thermistor 64, and that information is used by the controller 54 to change the desired temperature of the chamber 58. The following equation can be used by the controller 54 to dynamically control the chamber temperature.

$$T_{CHAMBER} = (K*T_{NOMINAL} - C*T_{AMBIENT})/(K-C) \qquad \text{(Eqn. 1)}$$

$T_{CHAMBER}$ is the dynamic temperature of the chamber, $T_{NOMINAL}$ is the desired temperature of the thermo-stabilized device, $T_{AMBIENT}$ is the ambient temperature, C is the temperature resolution for the chamber. For example, C can be 0.1° C., meaning that temperature measurements for the chamber are rounded to the nearest 0.1° C.; and K is the coefficient indicative of the characteristics of the chamber 58 and the heat transfer leakage paths. Specifically, K is the temperature difference (between ambient and nominal chamber temperature) required to change the chamber temperature by the minimum resolution C. For example, if nominal chamber temperature is 35° C. and C is 0.1° C., then K is the temperature difference (between ambient and nominal chamber) required to change the chamber temperature by 0.1° C.

Alternatively, Eqn. 1 can be simplified to the following form, although it is not as accurate.

$$T_{CHAMBER} = T_{NOMINAL} - (C*(T_{AMBIENT} - T_{NOMINAL}))/K \qquad \text{(Eqn. 2)}$$

Table 1 illustrates an example of the operation of one embodiment of the present invention in which C is 0.10° C., K is 2.8° C., and the desired temperature for the device to be stabilized is 35° C.

TABLE 1

| Ambient Temperature | Chamber Temperature |
| --- | --- |
| 0.3 | 36.2 |
| 5.0 | 36.1 |
| 10.0 | 35.9 |
| 15.0 | 35.7 |
| 20.0 | 35.5 |
| 25.0 | 35.4 |
| 30.0 | 35.2 |
| 35.0 | 35.0 |
| 40.0 | 34.8 |
| 45.0 | 34.6 |
| 50.0 | 34.5 |
| 55.0 | 34.3 |
| 60.0 | 34.1 |
| 61.1 | 34.1 |

The present invention offers a significant improvement over devices which do not compensate for the effect of ambient temperature. Such improvement is illustrated Table 2, which shows test results measuring the center wavelength of each of two different fiber Bragg gratings. One set of measurements was taken when the ambient temperature was 0.3° C. and another set of measurements was taken when the ambient temperature was 61.1° C. In both cases, the assembly 40 is attempting to maintain the chamber at a constant 35° C. Part (a) of Table 2 shows test results from a thermo-electric assembly 40 as illustrated in FIG. 5. Part (b) of Table 2 shows results from an assembly 40 as illustrated in FIG. 7 and wherein an ambient temperature sensor 64 is used and the controller 54 utilizes a control method described by Eqn. 2 to provide a dynamic chamber temperature. The test results show that the embodiment illustrated in FIG. 7 provides for additional stabilization of the center wavelength of the fiber Bragg grating.

TABLE 2

|   |   | Heatsink Temperature (° C.) | | Change |
|---|---|---|---|---|
|   |   | 0.3 | 61.1 | (nm) |
| a) | λ1 (nm) | 1549.923 | 1549.946 | 0.023 |
|   | λ2 (nm) | 1558.397 | 1558.419 | 0.022 |
| b) | λ1 (nm) | 1549.935 | 1549.938 | 0.003 |
|   | λ2 (nm) | 1558.408 | 1558.410 | 0.002 |

This improved performance by the present invention allows, for example, closer spacing of channels in a wavelength division multiplexed system, thereby allowing more channels to be transmitted in the same wavelength range, and increasing the performance of the system.

The advantages of the various embodiments of the present invention can be further enhanced, for example, by further reducing the effects of heat transfer to and from the device. For example, the length of optical transmission medium in the chamber 58 can be increased so as to reduce the effects of heat transfer to and from the device through the optical transmission medium 14. Also, thermally conductive materials, such as thermally conductive grease, can be applied to the device 60 and/or the optical transmission medium 14 in the chamber 58 so as to increase the heat transfer between the device 60 and/or optical transmission medium 14 and the chamber 58 and/or thermo-electric device 42.

The present invention also includes systems 10 including one or more components including a thermo-electric assemblies 40 according to the present invention. For example, the present invention includes multi-dimensional networks and point to point links including one or more components, such as transmitters, receivers, amplifiers, add/drop devices, switches, routers, etc., including thermo-electric devices or assemblies according to the present invention.

The present invention also includes a method of thermo-stabilizing or controlling the temperature of a device. The method includes determining the temperature of a device to be thermo-stabilized, comparing that temperature to a desired temperature for the device, and selectively heating and cooling the device according to a variable hysteresis loop. The method also includes adjusting the magnitude of the heating and cooling by varying steady state current to a thermo-electric device thermally coupled to the device to be thermally stabilized or controlled.

The present invention also includes a method of thermo-stabilizing or controlling the temperature of a device by dynamically changing the temperature of the chamber housing the device as a function of ambient temperature, as described above.

It will be appreciated that the present invention provides for optical systems having optical amplifiers with improved performance. Those of ordinary skill in the art will further appreciate that numerous modifications and variations that can be made to specific aspects of the present invention without departing from the scope of the present invention.

For example, the processor 54 may assume some of the functions of the other components in the assembly 40. In one such embodiment, the comparator 50 is eliminated and the processor performs the comparison function and controls the switches 46–49, and software within the processor may calculate the variable hysteresis. Furthermore, although the present invention has been discussed in terms of use in an optical system, its advantages may also be realized in other systems, devices, and methods, such as electrical communications systems and other temperature control and temperature sensitive applications. Also, although the present invention has been presented in the context of the embodiment illustrated in the Figures, advantages of the invention can be realized with prior art devices, systems, and methods, although such prior art devices, systems, and methods may still retain some of the deficiencies described above. Other variations and modifications of the present invention are also contemplated, but it is intended that the foregoing specification and the following claims cover such modifications and variations.

What is claimed is:

1. A thermo-electric assembly, comprising:

a chamber;

a thermo-electric device in thermal communication with the chamber;

a first temperature sensor in thermal communication with the chamber;

a second temperature sensor in thermal communication with an ambient environment;

a controller responsive to the first and second temperature sensors and controlling the thermo-electric device, wherein the controller varies a temperature set point for the chamber as a function of a temperature of the ambient environment wherein the controller includes computer-readable code which, when executed by the controller, causes the controller to:

calculate a temperature set point for the chamber, wherein the temperature set point for the chamber is:

$T_{CHAMBER} = (K \cdot T_{Nominal} - C \cdot T_{AMBIENT})/(K-C)$, wherein $T_{CHAMBER}$ is the set point temperature of the chamber, $T_{NOMINAL}$ is the desired temperature of a device to be thermo-stabilized, $T_{AMBIENT}$ is the ambient temperature, C is the temperature resolution for the chamber, and K is a coefficient indicative of the characteristics of the chamber; and control the thermo-electric device to approach the temperature set point for the chamber.

2. The assembly of claim 1, wherein the controller varies a temperature set point for the chamber as a function of a temperature difference between a temperature of the chamber and a temperature of the ambient environment.

3. The assembly of claim 1, wherein the controller changes a hysteresis with respect to transitioning the thermo-electric device between heating and cooling modes, wherein the changing of the hysteresis is a function of a temperature difference between an ambient temperature and a temperature of the chamber.

4. The assembly of claim 1, wherein the controller changes the hysteresis in response to current flow through the thermo-electric device.

5. The assembly of claim 1, further comprising a variable power supply having a power output connected to the thermo-electric device and having a control input connected to the controller.

6. The assembly of claim 5, wherein the thermo-electric device forms part of a static H-bridge configuration.

7. The assembly of claim 6, further comprising:
a first switch connecting the output of the power supply to a first terminal of the thermo-electric device, and having a control input;
a second switch connecting the output of the power supply to a second terminal of the thermo-electric device, and having a control input;
a third switch connecting the first terminal of the thermo-electric device to ground, and having a control input;
a fourth switch connecting the second terminal of the thermo-electric device to ground, and having a control input; and
the controller provides control signals to the control inputs of the first, second, third, and fourth switches, and wherein the first, second, third, and fourth switches are in a static state when the thermo-electric device is in one of heating mode and cooling mode.

8. The assembly of claim 1, wherein the controller includes computer-readable code which, when executed by the controller, causes the controller to:
calculate a temperature set point for the chamber, wherein the temperature set point for the chamber is:

$$T_{CHAMBER} = T_{NOMINAL} - (C*(T_{AMBIENT} - T_{NOMINAL}))/K, \text{ wherein}$$

$T_{CHAMBER}$ is the set point temperature of the chamber,
$T_{NOMINAL}$ is the desired temperature of a device to be thermo-stabilized,
$T_{AMBIENT}$ is the ambient temperature,
C is the temperature resolution for the chamber, and
K is a coefficient indicative of the characteristics of the chamber; and control the thermo-electric device to approach the temperature set point for the chamber.

9. The assembly of claim 1, wherein the chamber includes a plurality of devices to be thermo-stabilized.

10. The assembly of claim 9, wherein the devices to be thermo-stabilized are selected from a group consisting of Bragg gratings and lasers.

11. The assembly of claim 7, wherein the controller includes a comparator having:
a first input terminal connected to the first temperature sensor;
a second input terminal connected to the second temperature sensor; and
an output terminal connected to the first, second, third, and fourth switches.

12. The assembly of claim 7, wherein the controller includes an integrated circuit having:
a first input terminal connected to the first temperature sensor;
a second input terminal connected to the second temperature sensor; and
an output terminal connected to the first, second, third, and fourth switches.

13. A method of controlling a temperature of a device, comprising:
determining a temperature of a chamber containing the device;
determining an ambient temperature;
determining a desired chamber temperature in response to the temperature of the chamber and the ambient temperature, wherein determining the desired chamber temperature includes solving the equation:

$$T_{CHAMBER} = (K*T_{NOMINAL} - C*T_{AMBIENT})/K - C), \text{ wherein}$$

$T_{CHAMBER}$ is the set point temperature of the chamber,
$T_{NOMINAL}$ is the desired temperature of a device to be thermo-stabilized,
$T_{AMBIENT}$ is the ambient temperature,
C is the temperature resolution for the chamber, and
K is a coefficient indicative of the characteristics of the chamber;

varying the desired chamber temperature in response to variations of the temperature of the chamber and the ambient temperature;
establishing a static current path through a thermo-electric device; and
controlling current flow through the static current path.

14. The method of claim 13, further comprising varying a hysteresis with respect to transitioning between a heating mode and a cooling mode.

15. The method of claim 14, wherein varying the hysteresis includes:
providing a first hysteresis setting;
determining a temperature difference between ambient temperature and chamber temperature;
changing the hysteresis in response to the temperature difference.

16. The method of claim 15, wherein determining a temperature difference includes determining current flow through the thermo-electric device.

17. The method of claim 15, wherein changing the hysteresis includes:
increasing the hysteresis when the temperature difference between ambient temperature and chamber temperature increases; and
decreasing the hysteresis when the temperature difference between ambient temperature and chamber temperature decreases.

18. The method of claim 13, wherein establishing a static current path includes:
establishing a static current path in a first direction through the thermo-electric device when the thermo-electric device is to operate in a cooling mode; and
establishing a static current path in a second direction, opposite the first direction, through the thermo-electric device when the thermo-electric device is to operate in a heating mode.

19. The method of claim 13, wherein establishing a static current path includes:
setting a plurality of switches in a conductive state;
setting a plurality of switches in a non-conductive state; and
maintaining the switches in their respective conductive and non-conductive states until a change in operating mode of the thermo-electric device is desired.

20. The method of claim 19, wherein controlling current flow includes controlling a power source connected to the switches.

21. The method of claim 13, wherein determining the desired chamber temperature includes solving the equation:

$$T_{CHAMBER} = T_{NOMINAL} - (C*(T_{AMBIENT} - T_{NOMINAL}))/K, \text{ wherein}$$

$T_{CHAMBER}$ is the set point temperature of the chamber,
$T_{NOMINAL}$ is the desired temperature of a device to be thermo-stabilized,
$T_{AMBIENT}$ is the ambient temperature,
C is the temperature resolution for the chamber, and
K is a coefficient indicative of the characteristics of the chamber.

* * * * *